US012675787B2

(12) United States Patent
Singh et al.

(10) Patent No.: US 12,675,787 B2
(45) Date of Patent: Jul. 7, 2026

(54) INTERFACE WIDGET TOOL FOR AUTOMATIC QR CODE GENERATION AND DISPLAY WITHOUT APPLICATION LAUNCHING

(71) Applicant: PAYPAL, INC., San Jose, CA (US)

(72) Inventors: Gurinder Singh, Hicksville, NY (US); Kevin Daniel Ireland, Stanford, CA (US); Ankit Rakesh Agarwal, San Jose, CA (US); Anthony Frank Aiello, San Francisco, CA (US); Nadezhda Ionova, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/687,505

(22) Filed: Mar. 4, 2022

(65) Prior Publication Data

US 2023/0281598 A1     Sep. 7, 2023

(51) Int. Cl.
*G06Q 20/38*          (2012.01)
*G06F 9/451*          (2018.01)
(Continued)

(52) U.S. Cl.
CPC ..... *G06Q 20/3274* (2013.01); *G06Q 20/3267* (2020.05); *G06Q 20/4016* (2013.01); *G06Q 2220/00* (2013.01)

(58) Field of Classification Search
CPC .......... G06Q 20/3274; G06Q 20/3267; G06Q 20/4016; G06Q 2220/00; G06Q 20/3276; G06Q 20/326
See application file for complete search history.

(56) References Cited

U.S. PATENT DOCUMENTS

2014/0279475 A1* 9/2014 Castrechini ......... G06Q 20/385
                                                            705/41
2015/0302398 A1    10/2015 Desai et al.
(Continued)

FOREIGN PATENT DOCUMENTS

JP          2005025377 A  *  1/2005

OTHER PUBLICATIONS

A. Duvander, "DX of SDKs vs Direct API Calls," APIMatic blog, Oct. 11, 2021, retrieved from: https://www.apimatic.io/blog/2021/10/dx-of-sdks-vs-direct-api-calls#:~:text=While%20calling%20an%20API%20directly,dramatically%20affect%20the%20developer%20experience. (Year: 2021).*

(Continued)

*Primary Examiner* — Jessica Lemieux
*Assistant Examiner* — Douglas W Pinsky
(74) *Attorney, Agent, or Firm* — Haynes and Boone, LLP

(57)          ABSTRACT

There are provided systems and methods for an interface widget tool for automatic QR CODE® generation and display without application launching. A user may engage in a transaction with another user, such as a purchase of goods, services, or other items a merchant at a merchant location using machine-readable codes. A machine-readable code may be provided via a mobile device of a user. In order to provide faster and more efficient code generation, an interface widget or other tool may be provided, which, on selection, may execute API calls to a server of a transaction processor. The transaction processor may generate a code without requiring the user to go through a code generation and processing flow in a corresponding application. The code may be limited in validity and may be presented via the widget. Once scanned, the code may provide encoded data for a financial instrument.

20 Claims, 6 Drawing Sheets

(51) Int. Cl.

| | |
|---|---|
| *G06F 16/23* | (2019.01) |
| *G06F 21/53* | (2013.01) |
| *G06Q 20/04* | (2012.01) |
| *G06Q 20/10* | (2012.01) |
| *G06Q 20/30* | (2012.01) |
| *G06Q 20/32* | (2012.01) |
| *G06Q 20/34* | (2012.01) |
| *G06Q 20/36* | (2012.01) |
| *G06Q 20/40* | (2012.01) |
| *G06Q 40/06* | (2012.01) |
| *G06T 7/10* | (2017.01) |
| *H04L 9/32* | (2006.01) |
| *H04L 29/06* | (2006.01) |
| *H04W 12/06* | (2021.01) |
| *H04W 12/08* | (2021.01) |
| *G06F 21/31* | (2013.01) |
| *G06F 21/32* | (2013.01) |
| *G06F 21/45* | (2013.01) |
| *G06F 21/57* | (2013.01) |
| *G06Q 40/02* | (2023.01) |
| *H04W 4/14* | (2009.01) |
| *H04W 12/062* | (2021.01) |
| *H04W 12/72* | (2021.01) |
| *H04W 60/00* | (2009.01) |

(56) References Cited

U.S. PATENT DOCUMENTS

| | | | |
|---|---|---|---|
| 2015/0379506 A1* | 12/2015 | Griffin | G06Q 20/3224 |
| | | | 705/44 |
| 2016/0034891 A1 | 2/2016 | Carpenter et al. | |
| 2016/0034892 A1 | 2/2016 | Carpenter et al. | |
| 2016/0253669 A1 | 9/2016 | Yoon et al. | |
| 2017/0286958 A1* | 10/2017 | Herman | G06Q 20/3821 |
| 2017/0344994 A1* | 11/2017 | Wang | G06Q 20/405 |
| 2017/0364904 A1* | 12/2017 | Wang | G06Q 20/105 |
| 2018/0260806 A1* | 9/2018 | Bhuma | G06Q 20/3226 |
| 2019/0066089 A1* | 2/2019 | Miryala | G06Q 20/367 |
| 2020/0042976 A1* | 2/2020 | Barrese | G06Q 20/3274 |
| 2021/0004463 A1* | 1/2021 | Todasco | G06F 21/565 |

OTHER PUBLICATIONS

Invitation to Pay Additional Fees for International Application No. PCT/US2023/013724 mailed on May 15, 2023, 3 pages.
International Search Report and Written Opinion for Application No. PCT/US2023/013724 mailed on Jul. 21, 2023, 19 pages.

* cited by examiner

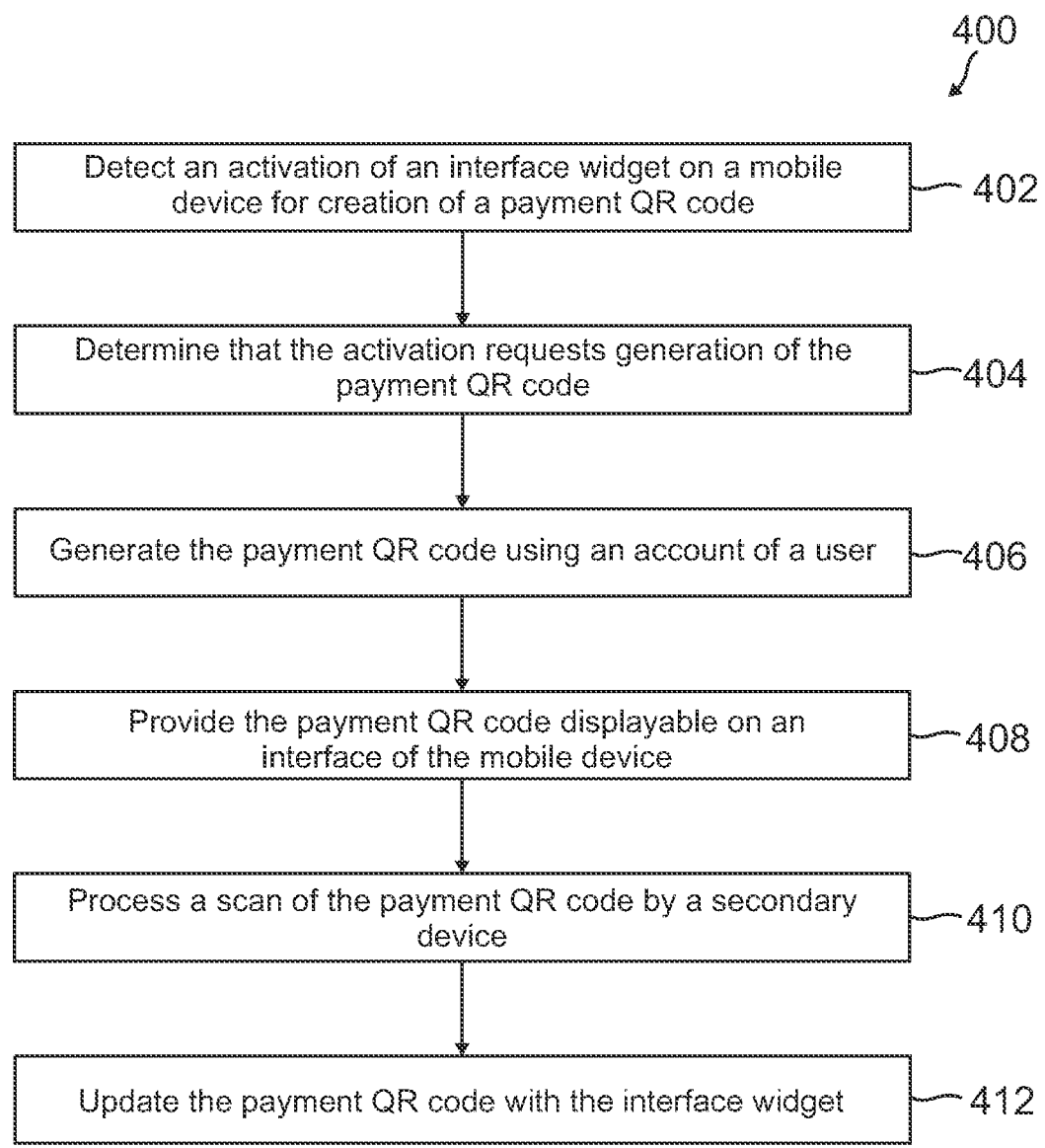

400

Detect an activation of an interface widget on a mobile
device for creation of a payment QR code    402

Determine that the activation requests generation of the
payment QR code    404

Generate the payment QR code using an account of a user    406

Provide the payment QR code displayable on an
interface of the mobile device    408

Process a scan of the payment QR code by a secondary
device    410

Update the payment QR code with the interface widget    412

FIG. 4

INTERFACE WIDGET TOOL FOR AUTOMATIC QR CODE GENERATION AND DISPLAY WITHOUT APPLICATION LAUNCHING

TECHNICAL FIELD

The present application generally relates to machine-readable codes presentable via mobile devices and more particularly to providing a mobile device widget tool for faster and automatic QUICK RESPONSE (QR) CODE® display for scanning via computing devices.

BACKGROUND

Users may utilize online transaction processors for processing payments between different entities through device applications and digital accounts. Further, these online transaction processors or other service providers may also provide physical payment instruments usable at merchant locations, such as displayable and machine-readable codes that may be output by mobile devices for scanning at those merchant locations. However, when utilizing a mobile application, the mobile application may require multiple inputs to navigate to particular interfaces and locate other digital accounts and users (e.g., consumer and merchant) on the application's platform. Further, multiple inputs may be required in order to generate a machine-readable code and properly display such a code on a mobile device. This may also require data calls and exchanges with a backend server, which adds additional time and delay for code generation and display. This involves time consuming processes when providing user input and properly navigating to, and providing display of, data within an interface of an application. Thus, the mobile applications of the online service providers may require multiple inputs and data processing steps, which result in more computing resources, user time, and potential errors in data entry and processing.

BRIEF DESCRIPTION OF THE DRAWINGS

FIG. 4 is a flowchart of an exemplary process for an interface widget tool for automatic QR CODE® generation and display without application launching, according to an embodiment.

Figure 1:
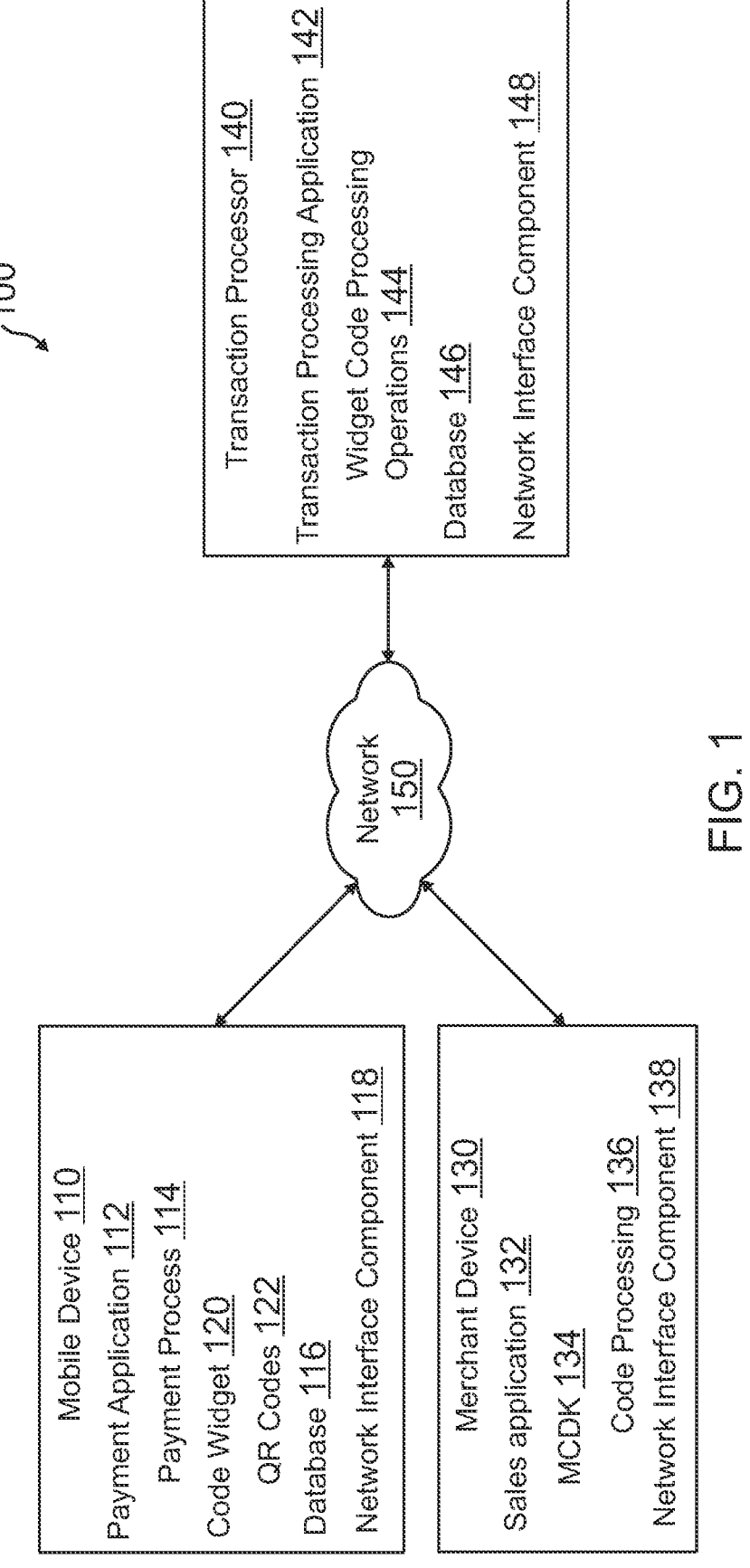
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for an interface widget tool for automatic QR CODE® generation and display without application launching. Systems suitable for practicing methods of the present disclosure are also provided.

A user may utilize a digital account to process payments through a payment, electronic card, and/or transaction network associated with a backend payment processor or other entity on the network. The digital account of the user may be associated with an online transaction processor or other service provider, such as a payment service provider (e.g., PayPal®, Venmo®, etc.), which may provide electronic transaction processing services to users through the account and one or more websites and/or applications of the online transaction processor or a merchant. The online transaction processor may provide the payment account that may be utilized with data encoded to a machine-readable code (e.g., QUICK RESPONSE (QR) CODE®, barcode, visual code, image, GIF or other graphical animation, photograph, video, or other displayable medium capable of displaying and/or transmitting information) that is displayable using a computing device, such as a mobile smart phone using a native application, webpage, and/or interface widget (e.g., home screen user interface). The computing device of the user may further include one or more storage mediums (e.g., local cache and/or database, RFID chip or antenna, NFC chip or transceiver, or the like) that may store machine-readable code data necessary to perform electronic transaction processing with the payment and/or transaction processing network. Thus, QR CODE®s and other displayable data may be used separately and/or in conjunction with transmission of data via data scanning, short-range wireless communications, and/or network communications.

When using a machine-readable code, such as a QR CODE®, to pay for a transaction, the user associated with an account may present the machine-readable code via an output component of a computing device, such as a graphical user interface (GUI) of a mobile smart phone. At other times, the user may want to provide or request a payment to another nearby user, such as to transfer money, settle a debit/credit, or the like. In order to provide faster code display and usage, the transaction processor or other service provider associated with the electronic transaction processing may provide an interface widget, such as a home screen widget, that may be accessible by the user using one or more user interfaces of the user's device. Once selected, the widget may make one or more application programming interface (API) calls to the transaction processor's backend systems, which requests generation of a QR or other machine-readable code for the user's device. The code may be generated by tokenizing and/or encoding data to a displayable machine-readable code, which, when scanned by a code scanning device, allows for electronic transaction processing. The code may be then displayed on the user's device via the interface widget, which may be done without requiring a user request, approval, and/or authorization in a mobile application. This may then allow the user to perform faster electronic transaction processing with merchant devices at physical merchant locations and using point-of-sale (POS) devices or other merchant terminals or devices (e.g., an iPad, tablet computing device, mobile smart phone, iPhone, other computing device, etc.).

In this regard, transaction processing may be performed through a mobile application of the online transaction processor on a mobile device of a user. The mobile device may correspond to a mobile smart phone, such as an iPhone running iOS or the like, an Android platform phone, or other mobile communication device. Further, the mobile device may correspond to wearable computing devices (e.g., Google Glass, smart watches, etc.), embeddable computing devices, and the like. In order to reduce the required inputs and perform faster data input and processing (e.g., by requiring less application navigations, inputs, and data processing), the user may provide a machine-readable code for capture by the device(s) of the other user(s). For example, a user may wish to process a purchase of the items via a digital account and/or payment card using an online transaction processor and/or electronic card network. Selection of one or more items for an in-person transaction at a physical merchant location or via an online marketplace or other digital platform may require a payment instrument from the user for electronic transaction processing. A user may pay for one or more transactions using a digital wallet or other account with an online service provider or other transaction processor (e.g., PayPal®), as well as machine-readable codes (e.g., through proffering the code and having the code scanned using a scanner at a merchant location, where the code may have encoded data that allows for transaction processing). An account for use of corresponding machine-readable codes with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions after identity confirmation. The account creation may also be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

In order to pay for the transaction (e.g., a transfer or payment to another user, merchant, or other entity), the user may provide the digital account, machine-readable code, and/or funding source information at a POS or other merchant device. A payment may then be issued to the other party to the transaction and transaction information may be stored with the digital wallet or account. In this regard, a digital token encoded to a machine-readable code or other data may authorize and/or authenticate the user for their digital wallet use and/or a payment instrument in the digital wallet, which may be transmitted to another party (e.g., the merchant) for payment processing. In some embodiments, the data may be encoded to and/or stored in a machine-readable code. A POS device and/or code reader/scanner may be used to read the machine-readable code using a merchant device at a merchant location. This may allow for user payments through a payment account and/or digital wallet, as well as credit available to the payment card and/or digital account. In some embodiments, the account and/or digital wallet may be linked to the user's device or application and a one-touch checkout process may be authorized by the user, where selection of a user interface widget may cause generation and/or display of the machine-readable code.

In this regard, when a user visits a merchant location that includes a machine-readable code scanner and merchant/POS device, such as a POS device that includes a bar and/or QR CODE® scanner, the user may utilize a mobile device for checkout and payment via an interface widget and/or mobile application. The POS devices may include a self-checkout, behind-the-counter scanning device (e.g., a machine-readable code countertop scanner or "gun" scanner), and/or another related POS device. The interface widget may correspond to a home screen and/or operating system (OS) widget, which may be quickly accessible via one or more interface icons, navigations, movements, and/or inputs. When establishing a machine-readable code for use, a user requesting and establishing the code may provide a funding source including a credit limit, debit source (e.g., bank account or financial account, points, gift cards, rewards, coupons, etc.), or other available funding including digital assets, including but not limited to cryptocurrency, NFTs, etc. The user may access and/or unlock their mobile computing device and may select the interface widget, which may cause an API call to be executed with a corresponding backend transaction processor. This call may request that the transaction processor generate a QR CODE® or other displayable code that includes encoded data, which allows for electronic transaction processing when scanned. The machine-readable code may correspond to one or more still or animated images and the like that may be issued to the user and/or for the transaction processing. The digital code and/or representation may be machine-readable code, such as a QR CODE® presentable using a user interface including touch screen and other output devices. The QR CODE® may form at least a portion of the interface and may include the entire interface.

Additionally, the machine-readable code may be presented via the interface widget without requiring the user to open and/or execute an application on the mobile device, such as by selecting, logging in to, and/or opening a mobile application corresponding to the transaction processor on the mobile device. The machine-readable code may be requested and/or generated without the user being required to provide a request, authentication, approval, and/or authorization in a corresponding mobile application of the transaction processor. As such, the user may be allowed to request QR CODE® generation and output via the user interface widget in an expedited and more convenient manner, which may require less user inputs, processing requests, API calls, and the like to be processed by the user's mobile device.

In response to the opening of and/or request via the interface widget for the machine-readable code, the transaction processor or other service provider may receive an API call and/or request, which informs the transaction processor of the widget opening and requests generation of a QR or other machine-readable code that is presentable via the interface widget. The transaction processor may then determine and access an account of the user, and may generate a QR CODE® for display via the interface widget using the account. For example, a QR CODE® may be generated by encoding account and/or payment instrument data to the QR CODE® (e.g., via one or more blocks, cells, dots, or the like of the QR CODE®). Funding instrument data may be passed from an application and/or digital wallet associated with the account to a server and/or platform, which allows for association of the funding instrument with a QR CODE®. The QR CODE® may then be provided to the user's mobile device, which may be stored locally and/or in a cache or database of the mobile device. Thereafter, when the interface widget is open, in a foreground, and/or executing, the QR CODE® may be display via an output component of the mobile device. For example, a touch screen interface or other display component may display the QR CODE® via the interface widget. This may be performed without the user being required to open, log in to, authenticate, and/or provide a request in a corresponding mobile application on the mobile device, such as a resident dedicated application or web browser on the mobile device that may communicate with the transaction processor.

Thereafter, when the merchant or the other user(s) captures the code through a camera, code scanner, POS device, or the like, financial instrument and/or other account data other data may be automatically loaded for use by one or more operations and/or interfaces within the mobile application(s). The QR CODE® and scanning of the QR CODE® also allows for account-to-account payments and transfers to be facilitated using the different accounts on the peer-to-peer payment or social networking network of the online transaction processor. The merchant may scan or image the QR CODE® using an application, such as a POS device application, mobile application, and/or merchant sales device application. The application may be associated with the online transaction processor and may utilize a merchant-consumer development kit (MCDK), such as a software development kit (SDK) provided by the transaction processor. When imaging the QR CODE®, the merchant may provide transaction information with the QR CODE® for a payment to be made with the digital account of the user. This payment may be requested without the user being required to open and/or approve of the transaction processing via the mobile application on the user mobile device.

Thereafter, the merchant's device may execute one or more API calls to communicate with one or more APIs of the online transaction processor and retrieve the linked data to the QR CODE® and/or request transaction processing. For example, a merchant POS device may exchange data with one or more servers of the transaction processor, which may provide the QR CODE® with transaction data for processing. The transaction data and transaction processing may be provided by the merchant's device without requiring a confirmation or approval by the user in a mobile application on the user's mobile or other computing device. Thus, the transaction processing may be facilitated using the QR or other machine-readable code presented via the interface widget accessible via a home screen or other interface of the user's device in a faster and more efficient manner.

Thereafter, the transaction processor may provide electronic transaction processing using the account of the user and/or funding or payment instrument provided by the user (e.g., via the account and/or encoded in the QR CODE®). The merchant device may receive transaction approval and/or denial based on the results of the transaction processing. This may be done through one or more API calls and/or data exchanges, where the merchant device may receive a result of transaction processing, which may be used for transaction approval/denial, receipt printing, and other transaction processing history information. The QR or other machine-readable code on the user's mobile device may be time limited and/or limited to a certain number of scans, such as a single scan by a merchant device that may be required in ten minutes of code generation by the transaction processor. This may be done to limit risk and fraud from obtaining the QR or other machine-readable code by malicious devices. Further, this may prevent accidental scanning and may invalidate the code after a period of time to assist with preventing double or other accidental scanning and multiple code usages. Thus, if the code is previously used and/or deemed to be expired after a period of time, the transaction may be declined, and the user's device may be required to refresh and/or request generation of a new machine-readable code via the interface widget.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a mobile device 110, a merchant device 130, and a transaction processor 140 in communication over a network 150. Mobile device 110 may be used to display an image of a machine-readable code, such as a QR CODE®, on a display screen, touch screen interface, or other output component to merchant device 130. The machine-readable code may be used to provide, load, and/or display encoded account data in one or more interfaces of mobile device 110 automatically from an interface widget or other widget tool on mobile device. Transaction processor 140 may be used to generate and provide the machine-readable code to mobile device 110. Thereafter, mobile device 110 may process a payment request to send or receive funds with merchant device 130 using the machine-readable code and transaction processor 140.

Mobile device 110, merchant device 130, and transaction processor 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Mobile device 110 may be implemented using any appropriate hardware and software configured for wired and/or wireless communication with merchant device 130, and/or transaction processor 140 for processing payments and transfers with a user of merchant device 130, for example, by imaging a machine-readable code provided by mobile device 110. Mobile device 110 may correspond to an individual user, consumer, or other payee that utilizes a peer-to-peer payment network and platform provided by transaction processor 140 to process those payments with merchant device 130. In various embodiments, mobile device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Mobile device 110 of FIG. 1 contains a payment application 112, a code widget 120, a database 116, and a network interface component 118. Payment application 112 and code widget 120 may correspond to executable processes, procedures, and/or applications with associated hardware. In other embodiments, mobile device 110 may include additional or different software as required.

Payment application 112 may correspond to one or more processes to execute modules and associated devices of mobile device 110 to provide a convenient interface to permit a user for mobile device 110 to enter, view, and/or process items the user wishes to purchase in a transaction, as well as perform peer-to-peer payments and transfers on a payment platform provided by transaction processor 140. In this regard, payment application 112 may correspond to specialized hardware and/or software utilized by mobile device 110 that may provide transaction processing for the items, such as through a user interface enabling the user to enter and/or view the items that the user associated with mobile device 110 wishes to purchase. Payment application 112 may also be used by a first user to provide payments and transfers to a second user or merchant associated with merchant device 130 using a payment process 114. For example, payment application 112 may utilize user financial information, such as credit card data, bank account data, or other funding source data, as a payment instrument when providing payment information via payment process 114. Additionally, payment process 114 may utilize a digital wallet associated with an account with a payment provider as the payment instrument, for example, through accessing a digital wallet or account of a user through entry of authentication credentials and/or by providing a data token that allows for processing using the account. In some embodiments, payment process 114 may be used to request generation of and display a machine-readable code, such as a QR CODE®, which may facilitate electronic transaction processing by providing account data and/or a financial instrument for payment processing.

Payment application 112 may also be used to receive a receipt or other information based on transaction processing. In various embodiments, payment application 112 may correspond to a general browser application configured to retrieve, present, and communicate information over the Internet (e.g., utilize resources on the World Wide Web) or a private network. For example, payment application 112 may provide a web browser, which may send and receive information over network 150, including retrieving website information, presenting the website information to the user, and/or communicating information to the website, including payment information for the transaction. However, in other embodiments, payment application 112 may include a dedicated application of transaction processor 140 or other entity (e.g., a merchant), which may be configured to assist in processing transactions electronically, such as a peer-to-peer payment application associated with a peer-to-peer payment and social network platform provided by transaction processor 140.

Payment application 112 and/or an OS or other platform of mobile device 110 may provide code widget 120, which may be used to request and display QR CODE®s 122 in a faster and more efficient manner than utilizing payment application 112 to request and display a machine-readable code and/or QR CODE®s 122. Thus, code widget 120 may further enable the user associated with mobile device 110 to display an image, video (e.g., when a machine-readable code may be dynamic and/or animated), or otherwise scannable version of a machine-readable code that includes encoded an account identifiers, data, financial instruments, or the like to mobile device 130. Code widget 120 may be accessible via a home screen interface or other displayable interface of mobile device 110. When selected, code widget 120 may be used to execute one or more API calls to transaction processor 140, which requests generation of one or more of QR CODE®s 122 displayable via an output component of mobile device 110. QR CODE®s 122 may be displayable when code widget 120 is executing and/or in a foreground of an OS of mobile device 110. Code widget 120 may receive QR CODE®s 122 from transaction processor 140, and may further display or otherwise present (e.g., based on the data provided by transaction processor 140) an application interface associated with a peer-to-peer payment or transfer using QR CODE®s 122. The interface may include an option to enter an amount, send or request the amount, provide a message or graphical object, or otherwise converse and social network with merchant device 130.

When opening code widget 120 and requesting generation of one or more of QR CODE®s 122, payment application 112 may not be required to access payment process 114 and/or request generation of QR CODE®s 122. Thus, an approval, confirmation, authentication, or the like may not be required by a user in mobile device 110. In particular, in response to opening of code widget 120, an API call may be exchanged with transaction processor 140 to request encoding of a financial instrument or account data to one or more of QR CODE®s 122. QR CODE®s 122 may be limited by time and/or use (e.g., a number of scans), and may become expired or invalidated after a time period and/or after a number of scans or uses. QR CODE®s 122 may be displayable using an output component of mobile device 110. Merchant device 130 may then scan one or more of QR CODE®s 122, which may be used for electronic transaction processing.

Mobile device 110 may include additional applications to provide features to mobile device 110. For example, additional applications may include security applications for implementing client-side security features, programmatic client applications for interfacing with appropriate application programming interfaces (APIs) over network 150, or other types of applications. Additional applications may include email, texting, voice and IM applications that allow a user to send and receive emails, calls, texts, and other notifications through network 150. Additional applications may also include other location detection applications, which may be used to determine a location for mobile device 110, such as a mapping application. Additional applications may include device interface applications and other display modules that may receive input from the user and/or output information to the user. For example, additional applications may contain software programs, executable by a processor, including a graphical user interface (GUI) configured to provide an interface to the user. Additional applications may therefore use components of mobile device 110, such as display components capable of displaying information to users and other output components, including touch screen interfaces, speakers, and the like.

Mobile device 110 may further include database 116 which may include, for example, identifiers such as operating system registry entries, cookies associated with payment application 112 and/or additional applications, identifiers associated with hardware of mobile device 110, or other appropriate identifiers. Identifiers in database 116 may be used by a payment/service provider to associate mobile device 110 with a particular account maintained by the payment/service provider. Database 116 may also further store received transaction data, as well as processed transaction data. In various embodiments, a machine-readable code displayable using code widget 120, such as QR CODE®s 122, may be stored by database 116.

Mobile device 110 includes at least one network interface component 118 adapted to communicate with merchant device 130 and/or transaction processor 140 over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Merchant device 130 may be implemented using any appropriate hardware and software configured for wired and/or wireless communication with mobile device 110 and/or transaction processor 140 for establishing and processing a transaction based on one or more of mobile device 110, QR CODE®s 122, and/or merchant device 130. Merchant device 130 may correspond to a merchant or second user that receives a payment or transfer from a first user associated with mobile device 110 based on merchant device 130 scanning, imaging, or otherwise capturing QR CODE®s 122 on mobile device 110. In various embodiments, merchant device 130 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Merchant device 130 of FIG. 1 contains a sales application 132 and a network interface component 138. Sales application 132 may correspond to executable processes, procedures, and/or applications with associated hardware. In other embodiments, merchant device 130 may include additional or different software as required.

Sales application 132 may correspond to one or more processes to execute software modules and associated components of mobile device 110 to process electronic transactions at a physical merchant location by a merchant associated with merchant device 130, as well as sending and receiving payments with a user associated with mobile device 110. In this regard, sales application 132 may correspond to specialized hardware and/or software utilized by the merchant of merchant device 130 to establish a transaction, for example, by requesting payment for a purchase of certain items or services at a physical location that may be scanned and/or entered to merchant device 130. At a physical merchant location, sales application 132 may designate the items for purchase or the user may bring items to a checkout, where merchant device 130 may request card data, account data, or other financial data to process the transaction. For example, the transaction data may be received via a checkout interface dynamically rendered through sales application 132. Sales application 132 may further provide one or more user interfaces to send and receive payments or transfers with the user associated with mobile device 110, for example, in response to merchant device 130 capturing QR CODE®s 122 on mobile device 110 and transmitting a payment request to sales application 132 via transaction processor 140.

In various embodiments, sales application 132 may receive the payment request from mobile device 110, which may be received through a digital payment platform. Sales application 132 may display information for the payment request, such as the amount required to be paid by mobile device 110 using QR CODE®s 122. Thus, an interface of sales application 132 may include interface data and interface elements that allow for interaction with the payment request and/or viewing additional transaction data for a transaction associated with the payment request. During transaction processing, such as to provide a payment or transfer from the user's digital account and/or financial or funding instrument, sales application 132 may be utilized to enter and/or select payment instrument(s) for use in providing payment for a purchase, transfer, or other financial process.

As discussed herein, sales application 132 may utilize user financial information, such as credit/debit card data, bank account data, or other funding source data, as a payment instrument when providing payment information. This information may be provided using QR CODE®s 122, which may be rendered and output via mobile device 110 using QR CODE®s 122. An MCDK 134 may be used for code processing 136 of QR CODE®s 122, where MCDK 134 may provide for SDK operations and functionalities to exchange API calls with transaction processor 140 for processing of QR CODE®s 122. Thus, code processing 136 may correspond to one or more software functionalities to request payment using QR CODE®s 122 and any entered transaction data for a transaction for processing using merchant device 130. Code processing 136 may perform electronic transaction processing without requiring a user approval via payment application 122, and may therefore include and/or request risk analysis and fraud detection operations when QR CODE®s 122 are scanned and processed.

Sales application 132 may also be used to receive a receipt or other information based on transaction processing. Sales application 132 may correspond to a general browser application configured to retrieve, present, and communicate information over the Internet (e.g., utilize resources on the World Wide Web) or a private network. For example, sales application 132 may provide a web browser, which may send and receive information over network 150, including retrieving website information, presenting the website information to the user, and/or communicating information to the website, including payment information for the transaction. Sales application 132 may also or alternatively include a dedicated application of transaction processor 140 or other entity (e.g., a merchant), which may be configured to assist in processing transactions electronically.

Merchant device 130 may further include a database, which may include, for example, identifiers such as operating system registry entries, cookies associated with sales application 132, identifiers associated with hardware of merchant device 130, or other appropriate identifiers. Identifiers in the database may be used by a payment/service provider to associate merchant device 130 with a particular account maintained by the payment/service provider. The database may also further store received transaction data for processed transactions, as well as card data, account data, or other financial data used to process such transactions and/or respond to payment request resulting from capturing QR CODE®s 122.

Merchant device 130 includes at least one network interface component 138 adapted to communicate with mobile device 110 and/or transaction processor 140 over network 150. In various embodiments, network interface component 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor 140 may be maintained, for example, by an online service provider, which may provide processes to provide account services and process payments, as well as peer-to-peer payment services associated with an online digital platform and mobile applications. In this regard, transaction processor 140 includes one or more processing applications which may be configured to interact with mobile device 110, merchant device 130, and/or another device/server to facilitate communications and transactions between users, which may include QR CODE® processing for transactions. Transaction processor 140 may be maintained by or include another type of platform or service provider, for example, a transaction processor such as PAYPAL®, Inc. of San Jose, CA, USA. Although mobile device 110 and transaction processor 140 are discussed as separate devices and servers, in some embodiments, one or more of the described processes of may instead be provided by the other device or server, or the same device or server.

Transaction processor 140 of FIG. 1 includes a transaction processing application 142, a database 146, and a network interface component 148. Transaction processing application 142 and other applications 142 may correspond to executable processes, procedures, and/or applications with associated hardware. Transaction processor 140 may include additional or different modules having specialized hardware and/or software as required.

Transaction processing application 142 may correspond to one or more processes to execute modules and associated specialized hardware of transaction processor 140 to process a transaction for item(s) with mobile device 110, QR CODE®s 122, and/or merchant device 130, which may be based on one or more transactions processed by scanning of QR CODE®s 122 by merchant device 130. In this regard, transaction processing application 142 may correspond to specialized hardware and/or software used by a user associated with mobile device 110 and/or second computing device to establish an account with transaction processing application 142 by providing personal and/or financial information to transaction processor 140 and selecting authentication credentials. In various embodiments, the financial information may include payment instrument information, such as account/card numbers and information. The account may be used to purchase items and/or transfer funds, for example, through widget code processing operations 144 that allow for generation of QR CODE®s 122 and processing payments when QR CODE®s 122 are scanned. The payment account may be accessed and/or used through a browser application and/or dedicated payment application executed by mobile device 110 and/or merchant device 130, such as payment application 112 and/or sales application 132. Additionally, transaction processing application 142 may be used to create, establish, and/or link to the account of a user so that QR CODE®s 122 may be used. Transaction processing application 142 may process a payment and may provide a transaction history for transaction authorization, approval, or denial, Transaction processing application 142 may correspond to an application of transaction processor 140 that may be utilized by end users and merchants to perform electronic payments, transfers, and the like using one or more accounts and/or financial instruments. Transaction processing application 142 may be used to provide MCDK 134, which may be used to configure merchant device 130 for electronic transaction processing using QR CODE®s scannable by merchant device 130. Transaction processing application 142 may also include or utilize different processors, engines, or modules as required for an authentication, account setup and maintenance, electronic transaction processing, deposit and/or withdrawal, risk and fraud detection and resolution, dispute resolution, and the like, for example, through widget code processing operations 144. Transaction processing application 142 may include one or more APIs utilized to communicate with mobile device 110 and/or merchant device 130 to allow for generating QR CODE®s 122 when code widget 120 is executed and/or opened. For example, widget code processing operations 144 may receive requests for QR CODE®s 122 from mobile device 110 via one or more API calls, which may be done via code widget 120 without requiring approval and/or opening of payment application 112. Widget code processing operations 144 may provide QR CODE®s 122 to mobile device 110, which may then display those codes. When QR CODE®s 122 are captured by merchant device 130, additional API calls and/or operations may be processed in order to process QR CODE®s 122, check validity (e.g., based on expiration time periods, number of uses or scans, and the like), and determine whether to process a transaction using the scanned code, encoded financial instrument or other payment data, and/or received transaction data.

Additionally, transaction processor 140 includes database 146. Database 146 may store various identifiers associated with mobile device 110. Database 146 may also store account data, including payment instruments and authentication credentials, as well as transaction processing histories and data for processed transactions. Database 146 may store received data associated with a user for use with QR CODE®s 122. This may include different account information, QR CODE® display preferences (e.g., display of certain account information), as well as encoded data to QR CODE®s 122 and/or limits on usage and/or validity of QR CODE®s 122 (e.g., a validity time period and/or number of uses or scans).

In various embodiments, transaction processor 140 includes at least one network interface component 148 adapted to communicate with mobile device 110, merchant device 130, and/or another device/server for a merchant over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
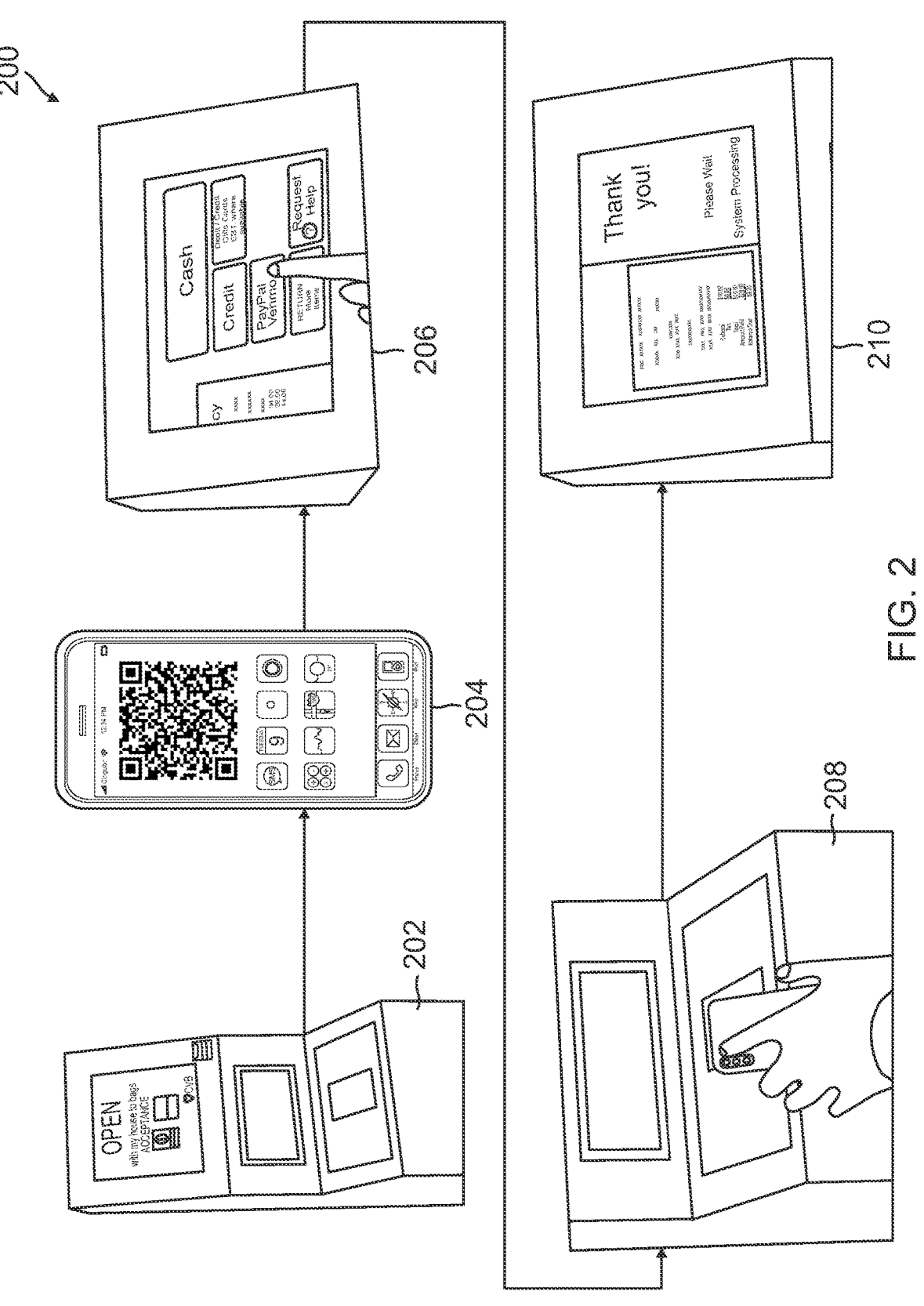
FIG. 2 is an exemplary flow and set of interactions and interfaces to provide an interface widget tool for automatic machine-readable code generation and checkout, according to an embodiment.

FIG. 2 is an exemplary flow and set of interfaces 200 to provide an interface widget tool for automatic machine-readable code generation and checkout, according to an embodiment. Interfaces 200 may be displayed by mobile device 110 and/or merchant device 130 discussed in reference to system 100 of FIG. 1. In this regard, interfaces 200 may provide for expedited machine-readable code generation, display, and processing using transaction processor 140 from system 100.

Interfaces 200 include a first merchant device interface 202, which may be displayed by a POS device or other merchant device at a physical merchant location in order to perform electronic transaction processing. A user may enter one or more items for purchase to the merchant device, such as by providing to a merchant employee, scanning the items, and/or otherwise entering item data to the merchant device (e.g., SKU codes, bar/QR CODE®s, or other identifiers). First merchant device interface 202 may include one or more input components, including touch screen interfaces, to allow for navigation and/or transaction processing. Once a transaction is input, the corresponding merchant device may request payment via one or more funding or financial instruments.

In order to process transactions electronically, an interface 204 may then be opened and/or executed on a corresponding mobile device of the user. Interface 204 may correspond to a home screen and/or OS widget, which may be selected via a home screen interface and/or navigations on the corresponding mobile device. However, interface 204 does not require opening of a corresponding mobile application or other device application and/or interface. For example, interface 204 may be opened and/or brought to a foreground by selecting an interface icon and/or process for an interface widget on the mobile device and does not require opening and/or executing an application, authenticating in the application, and requesting generation of a QR CODE® or other machine-readable code in the application. Thus, when interface 204 is opened, a QR CODE® displayed in widget interface may be requested from a transaction processor server via an API call without requiring user input and/or approval in the corresponding application.

Thereafter, the transaction processor may then return data for the QR or other machine-readable code to the mobile device, which is shown in interface 204. The code may be displayed via an output component, such as a device interface. In interfaces 200, the user may then return to the POS or other merchant device and may select an interface option in a second merchant device interface 206 to perform electronic transaction processing using the corresponding online transaction processor for the machine-readable code. This may cause the merchant device to initial a process that informs the user to scan or otherwise enter the machine-readable code to the merchant device via a scanner interface 208. Scanner interface 208 may correspond to a code scanner, such as a visible light, infrared, red laser, or other code scanner. Scanner interface 208 may correspond to a self-checkout, behind-the-counter scanning device (e.g., a machine-readable code countertop scanner or "gun" scanner), and/or another related POS device that may enable reading and/or scanning of a code. The user's mobile device may be presented to scanner interface 208, which may then capture the machine-readable code and provide the machine-readable code as input to a corresponding transaction that was generated using the interfaces of the merchant device.

Thereafter, the merchant device may utilize a MCDK or other SDK and corresponding installed and/or configured payment processes to execute API calls with a backend server and/or payment processing gateway of the online transaction processor. The API calls may request electronic transaction processing using the code and entered transaction information. This may be done without requiring the user to enter and/or provide approval in a mobile application of the user's mobile device that is associated with the transaction processor. The transaction processor may then execute a validity check and/or risk and fraud analysis to determine whether to process the transaction. If passed, a checkout interface 210 may be displayed by the merchant device, which confirms electronic transaction processing and approval of payment. However, if the validity and fraud checks are not passed, the transaction may also be refused instead in checkout interface 210.

Figure 3A:
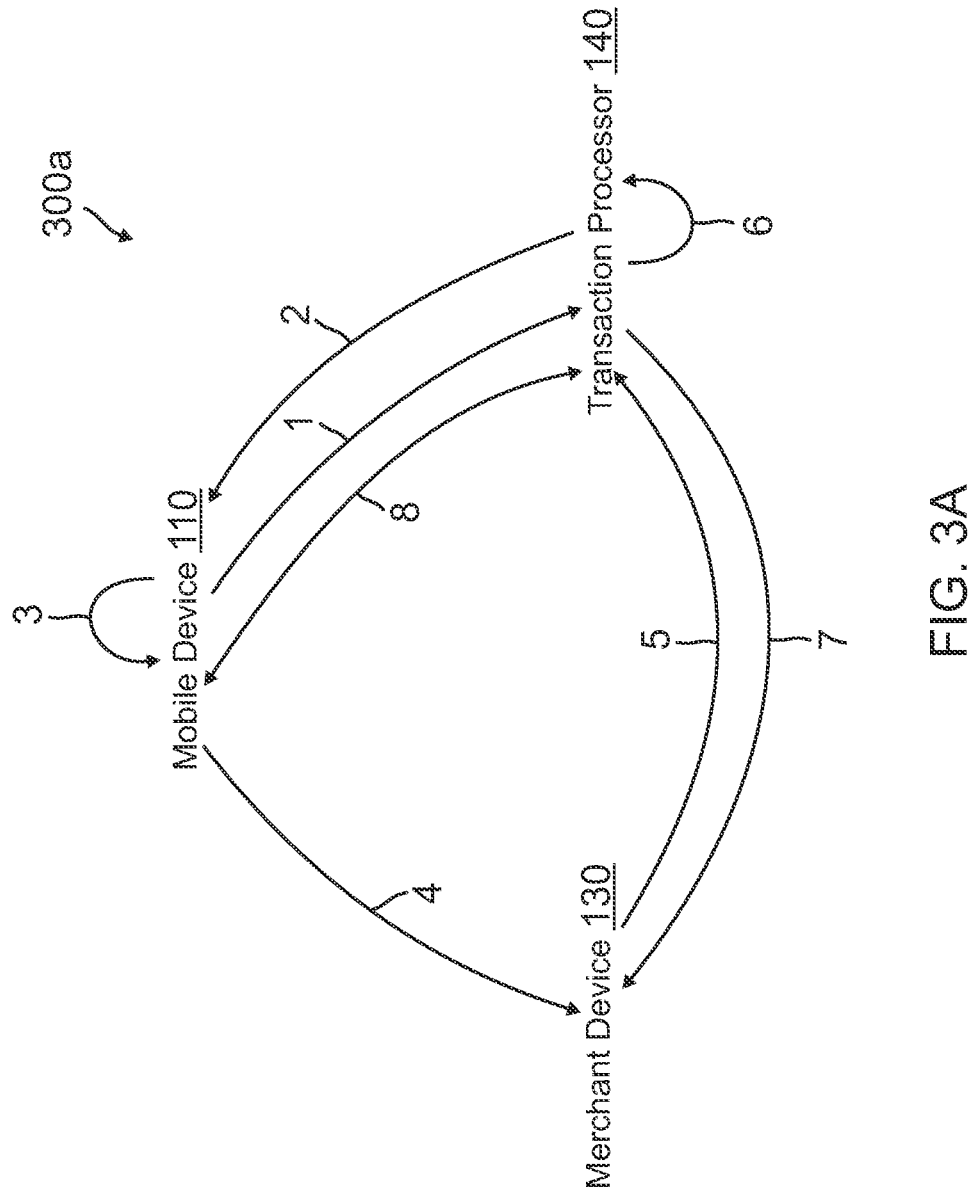
FIG. 3A is an exemplary environment of devices interacting to automatically generate and utilize machine-readable codes during checkout, according to an embodiment.

FIG. 3A is an exemplary environment 300a of devices interacting to automatically generate and utilize machine-readable codes during checkout, according to an embodiment. Environment 300a includes mobile device 110, merchant device 130, and transaction processor 140 discussed in reference to system 100 of FIG. 1. In this regard, environment 300a includes interactions used for automatic machine-readable code generation and display using an interface widget on mobile device 110.

Environment 300a therefore includes mobile device 110 displaying a QR or other machine-readable code to merchant device 110, which may then be processed with transaction processor 140. Initially, at an interaction 1, mobile device 110 may open, execute, and/or bring to a foreground of an OS, a corresponding interface widget or other tool. During interaction 1, mobile device 110 may then execute one or more API calls to transaction processor 140 in response to the interface widget opening, which may request that transaction processor 140 identify funding or financial source information, such as a payment account and/or payment card and encode that data to a machine-readable code. Transaction processor 140 may receive a device and/or account identifier, or other data that may be linked to and/or accessible using the interface widget or mobile application on mobile device 110, and may determine the corresponding payment instrument data to be encoded to the machine-readable code. Transaction processor 140 may then perform the code generation, and at an interaction 2, may provide the machine-readable code back to mobile device 110.

During interaction 2, the machine-readable code may be loaded to mobile device 110 and/or the interface widget for display of the code. Further, the code may be cached or stored locally by mobile device 110. At an interaction 3, mobile device 110 may store and load the machine-readable code, and may then present the machine-readable code via an output component of mobile device 110, such as a display component or interface. During interactions 2 and 3, the user may not be required to login, open, and/or authenticate in a corresponding mobile application such that the machine-readable code may be automatically generated and output using the interface widget. Once displayed, at an interaction 4, merchant device 130 may scan the machine-readable code using a scanner or other input component. Merchant device 130 may then execute one or more API calls using a MCDK or other SDK operations during an interaction 5 to transaction processor 140, which may be configured on merchant device 130. During interaction 5, transaction data may also be provided to transaction processor 140 with the scanned machine-readable code and/or encoded data from scanning the code.

Transaction processor 140, at an interaction 6, may then process the transaction data based on the data encoded to the machine-readable code. The data encoded to the machine-readable code may correspond to account data or other financial or funding instrument data. During interaction 6, transaction processor 140 may determine whether the scan of and/or use of the machine-readable code is valid and the code has not expired or been invalidated. For example, the code may expire after a single use and scan, after an amount of time, or based on another parameter (e.g., based on merchant location, time of use, items in the transaction, cost of the transaction, etc.). For example, a code may be limited by and/or expire after an amount of time (e.g., ten minutes), a number of uses (e.g., one scan, a limited number of scans with a particular merchant, etc.), a total cost of the transaction and/or uses of the code (e.g., valid only for a maximum limit of $100, which may expire after a single or multiple transactions), and/or specifically designated use of the code (e.g., at a particular merchant location, with a specified merchant, for specific items and/or services, etc.). Transaction processor 140 may further execute a risk and/or fraud analysis at interaction 6, which may be used to determine whether to process the transaction. At an interaction 7, transaction processor 140 may provide a result to merchant device 130. The result may approve or decline electronic transaction processing, and merchant device 130 may receive a receipt or transaction processing history.

Thus, interaction 7 may be used to approve or decline the transaction on merchant device 130. Next, at an interaction 8, transaction processor 140 may provide a result to mobile device 110. This may correspond to data loaded to an application of mobile device 110 and/or accessible via the interface widget displaying the machine-readable code. The data may provide information about the scan of the code, the transaction, and/or the results of the transaction, and may be used for additional fraud protection. Further, the data may be accessible when the application is loaded or may be cached or stored for later use and viewing via the application and/or interface widget.

Figure 3B:
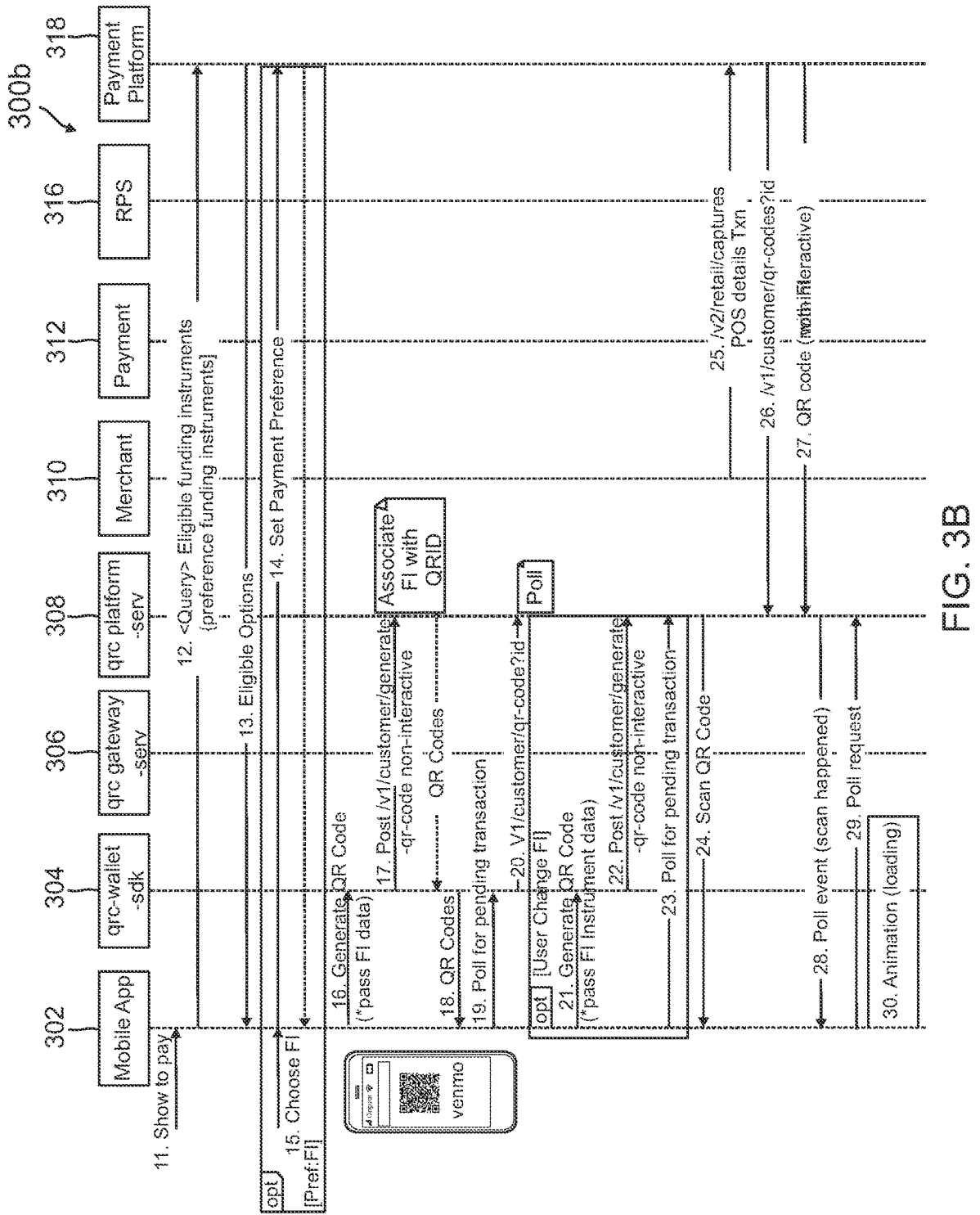
FIG. 3B is an exemplary diagram of data calls and exchanges for generating and utilizing machine-readable codes via an interface widget, according to an embodiment.

FIG. 3B is an exemplary diagram 300*b* of data calls and exchanges for generating and utilizing machine-readable codes via an interface widget, according to an embodiment. Diagram 300*b* includes API calls and/or data exchanges performed via components of mobile device 110, merchant device 130, and transaction processor 140 discussed in reference to system 100 of FIG. 1.

In diagram 300*b*, initially a mobile application 302, such as an application that may be associated with an interface widget, is shown and utilized for payment and/or funding source selection at an interaction 11. This may cause mobile application 302 to query for eligible and/or available funding instruments from a payment platform 318 during an interaction 12, such as via an API call and/or request. Payment platform 318 may respond with eligible options during an interaction 13, which may allow for generation of a QR or other machine-readable code for presentation by the interface widget associated with mobile application 302. Thereafter, the user may opt-in and select a payment preference at an interaction 14, which establishes the funding or financial source or instrument to be used with machine-readable codes accessible and presented using the interface widget. At an interaction 15, the financial instrument is chosen and established with payment platform 318. Once interactions 11-15 are established, the corresponding mobile device and interface widget may be established for faster and more efficient machine-readable code generation and display for electronic transaction processing.

Thereafter, at an interaction 16, an interface widget or other tool associated with mobile application 302 is opened and a generate QR CODE® (or other machine-readable code) request is issued and/or exchanged with a QR CODE® (QRC) wallet SDK 304, which passes the financial instrument data and/or an identifier or preference for the financial instrument data to QRC wallet SDK 304. This may cause an interaction 17, which is non-interactive with the corresponding user and mobile application 302 (e.g., does not require approval in mobile application 302). During interaction 17, QRC wallet SDK 304 requests that a QRC gateway server 306 and/or a QRC platform server 308 generate a QR CODE® and/or identifier (ID) for the corresponding financial instrument. During an interaction 18, QRC platform server 308 returns to QRC wallet SDK and mobile application 302 with the QR IDs that were generated using the financial instruments. This may cause mobile application 302 to poll QRC wallet SDK 304 for pending transactions at an interaction 19. Thereafter, the QRC wallet SDK 304 may poll QRC platform server 308 for a customer/QR CODE® and/or identifier. In various embodiments, an optional process may be provided during an interaction 21 may be done that allows a user to change a financial instrument for a QR CODE®. Otherwise, mobile application 302 and corresponding interface widget request generation of a QR CODE® during interaction 21, which may include passing any necessary financial instrument data to QRC wallet SDK 304.

QRC wallet SDK 304 may then post and/or transmit an API call or request to a QRC platform server 308, during an interaction 22, for a QR CODE® to be generated. This may be non-interactive and may not require the corresponding user to login and/or approve QR CODE® generation via mobile application 302. Mobile application 302 may then poll for a pending transaction and QR CODE® from QRC platform server 308 at an interaction 23, which may cause display of the QR CODE® via the widget interface for mobile application 302. Thereafter, at an interaction 24, a scan of a QR CODE® may be detected by QRC platform server 308 when presented via the mobile device and interface widget.

Merchant 310 may then capture the QR CODE® an POS transaction details at an interaction 25, which provides such data and details to a Retail Payment Service (RPS) 316. This allows for processing by RPS 316 with QRC platform server 308. At an interaction 26, RPS 316 interactions with QRC platform server 308 for customer/QR CODE® retrieval, validation, and/or approval. This may include providing a QR CODE® with a funding instrument at an interaction 27 to QRC platform server 308 for processing. QRC platform server 308 may interact with the mobile device and/or mobile application 302 at an interaction 28 in order to inform that a scan happened and provide an event corresponding to the transaction processing using the QR CODE®. Mobile application 302 may respond by polling for the event and/or data at an interaction 29, which may provide transaction data for loading in mobile application 302. Thereafter, at an interaction 30, an animation and/or loading may be provided via mobile application 302 for the transaction results and/or other data.

FIG. 4 is a flowchart 400 of an exemplary process for an interface widget tool for automatic QR CODE® generation and display without application launching, according to an embodiment. Note that one or more steps, processes, and methods described herein of flowchart 400 may be omitted, performed in a different sequence, or combined as desired or appropriate.

At step 402 of flowchart 400, an activation of an interface widget on a mobile device for creation of a payment QR CODE® is detected. This may correspond to an opening, executing, and/or bringing to an OS foreground of the interface widget. For example, a GUI icon or other displayable tool may be presentable in an interface, home screen, and/or fast navigation link. The widget, when selected, may automatically execute an API call to a corresponding back-end transaction processor, which may provide details of a financial instrument for use with a transaction and request that a QR CODE® is generated using the financial instrument. The QR CODE® may be only generated or displayed if the user device is detected at a valid location, e.g., one where the service provider or other transaction processor indicates a user (merchant, individual, entity, etc.) associated with the location has an account with the service provider. This may provide additional security and improve processing by eliminating the need to generate (and later process and decline) the QR CODE® if the code is not generated at a location associated with a valid transaction.

At step 404, it is determined that the activation requests generation of the payment QR CODE®. For example, by opening the interface widget and/or detecting other parameters of the mobile device and/or user, the opening and/or activation may indicate that the payment QR CODE® is needed for expedited transaction processing. Further, by using the widget in place of a mobile application, an authorization, authentication, and/or approval of payment QR CODE® presentation and display may not be required and use of the widget may instead indicate that the QR CODE® is to be used for electronic transaction processing.

At step 406, the payment QR CODE® is generated using an account of a user. The payment QR CODE® is generated based on an identifier, preference, or opt-in by the user for a particular financial instrument or other data to be encoded to the QR CODE® for payment processing and scanning by a merchant or POS device. A payment QR CODE® may then be generated by creating and/or encoding a QR or other machine-readable code with information that, when scanned and/or decoded, may allow for processing using an account or other financial instrument of a user. At step 408, the payment QR CODE® displayable on an interface of a mobile device is provided. The payment QR CODE® may be provided back to the mobile device of the user, which may be stored locally and/or cached in order for presentation when the interface widget is executing and/or in a foreground of the mobile device.

At step 410, a scan of the payment QR CODE® by a secondary device is processed. The scan may be by a POS, merchant, and/or other user device, such as using a code scanner (e.g., red light scanner), camera, or other visual input device. When scanned, the QR CODE® may authorize electronic transaction processing based on the limitations of the QR CODE® (e.g., time, number of uses, transaction processing and/or location limits, etc.). Data from the scan may be provided by the code scanner to the system processing the payment. The QR CODE® or the funding instrument may be authorized and approved without the user being required to access and open a corresponding mobile application. The scan may then effectuate a payment or decline payment if validity and/or risk checks are not confirmed. At step 412, the payment QR CODE® is updated with the interface widget, for example, based on the scan. Updating the QR CODE® may include changing and/or invalidating the QR CODE®, such as if a scan is detected, if the scan exceeds a number of valid uses, and/or if a time expires.

Further, additional QR CODE®s may be generated in response to the scan and/or expiration of any validity terms.

Figure 5:
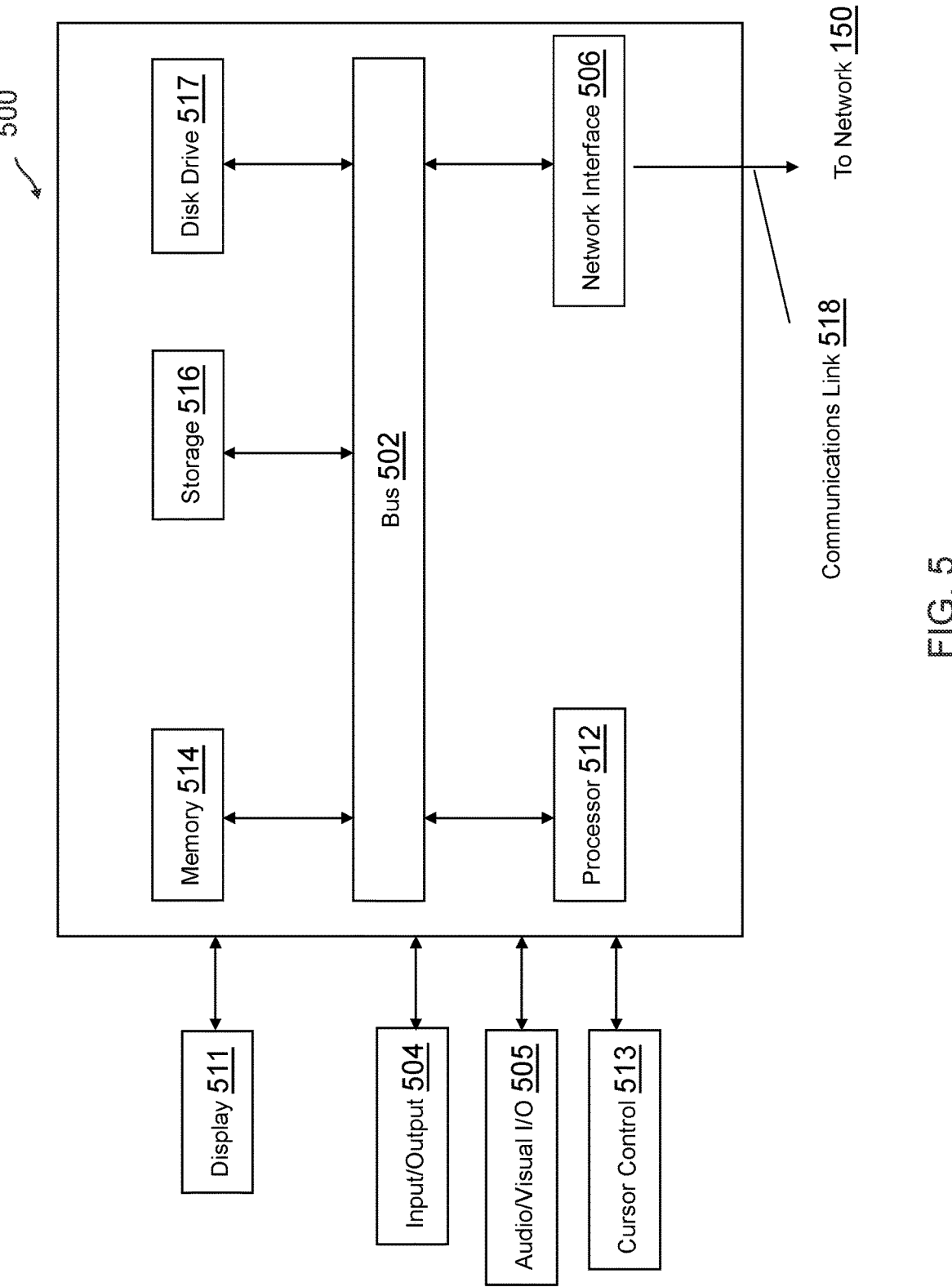
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:

a non-transitory memory; and one or more hardware processors coupled to the non-transitory memory and configured to read instructions from the non-transitory memory to cause the system to perform operations comprising:

detecting, via one or more processes of a first software development kit (SDK) for an application on a mobile device of a user, an activation of a code widget on the mobile device, wherein the activation comprises bringing the code widget to a foreground of a home screen interface on the mobile device independent of opening or executing the application;

determining, in response to the activation independent of a user input and an approval in the application, a first machine-readable code of a plurality of machine-readable codes displayable by the mobile device, wherein the first machine-readable code provides data for electronic transaction processing when the first machine-readable code is scanned;

generating the first machine-readable code using a digital token associated with an account of the user;

receiving an application programming interface (API) call from the one or more processes of the first SDK for the first machine-readable code for a transaction being processed via the code widget;

connecting with the application using the one or more processes of the first SDK;

transmitting the first machine-readable code to the application on the mobile device, wherein receiving the first machine-readable code by the application causes the first machine-readable code to be loaded in the code widget from the first SDK;

detecting a first scan performed by a merchant device of the first machine-readable code using a second SDK for a sales application on the merchant device, wherein the first scan is detected as being performed in association with the transaction being processed at the merchant device;

initiating, independent of interacting with the mobile device, a transaction processing request for the transaction directly with the merchant device via one or more API calls exchanged with the sales application using the second SDK;

validating the first scan of the first machine-readable code, wherein the validating comprises:

executing a risk analysis of the transaction based on a plurality of parameters associated with an analysis of the account associated with the digital token, a condition for an expiration of the first machine-readable code, and whether a previous scan of the first machine-readable code has occurred;

providing an event in the application on the mobile device using the first SDK based on the transaction processing request using the first machine-readable code, wherein the event indicates at least the first scan by the merchant device;

determining whether to process the transaction processing request using the account based on the validating;

providing an animation via the mobile device indicating a result of the transaction processing request using the first SDK; and updating the code widget in the home screen interface, wherein the updating the code widget includes replacing the first machine-readable code with a second machine-readable code.

2. The system of claim 1, wherein the risk analysis is further based on information for the merchant device.

3. The system of claim 2, wherein the risk analysis is further based on at least one of mobile device data or a history for the account.

4. The system of claim 1, wherein the first machine-readable code comprises a quick response (QR) code, and wherein the QR code is limited for an amount of time and a single scan of the QR code.

5. The system of claim 1, wherein subsequent to the detecting the first scan, the operations further comprise:

detecting a second scan of the first machine-readable code; and rejecting processing a transaction associated with the second scan based on the first scan.

6. The system of claim 1, wherein the operations further comprise:

invalidating the first machine-readable code after the expiration, wherein the updating is in response to one of a further request by the mobile device or an automatic generation decision by the system based on the invalidating.

7. The system of claim 1, wherein the first machine-readable code is generated based on a location of the mobile device, and wherein the condition for the expiration is associated with the location.

8. The system of claim 1, wherein, after the detecting the first scan, the operations further comprise:

determining encoded data in the first machine-readable code based on the first scan; and determining the account associated with the encoded data, wherein the account is utilized to process the transaction processing request.

9. The system of claim 1, wherein the activation is detected by the system based on an application programming interface (API) request from the mobile device to the system from the code widget without having a user approval via the application, and wherein the activation comprises a launching of the code widget.

10. The system of claim 1, wherein the merchant device is configured with a development kit that executes API calls with the system, and wherein the detecting the first scan comprises receiving the transaction processing request in response to the first scan via the development kit.

11. A method comprising:

detecting, via one or more processes of a first software development kit (SDK) for an application on a mobile device of a user, a use of a code widget on the mobile device, wherein the use comprises bringing the code widget to a foreground of a home screen interface on the mobile device independent of opening or executing the application;

determining, in response to the use independent of the user requesting a generation of a first machine-readable code in the application, a first machine-readable code displayable by the mobile device via the code widget, wherein the first machine-readable code provides data for electronic transaction processing when the first machine-readable code is scanned;

generating the first machine-readable code using a digital token associated with an account of the user;

receiving an application programming interface (API) call from the one or more processes of the first SDK for the first machine-readable code for a transaction being processed via the code widget;

connecting with the application using the one or more processes of the first SDK;

transmitting the first machine-readable code to the application on the mobile device, wherein receiving the first machine-readable code by the application causes the first machine-readable code to be loaded in the code widget from the first SDK;

detecting a first scan performed by a merchant device of the first machine-readable code using a second SDK for a sales application on the merchant device, wherein the first scan is detected as being performed in association with the transaction being processed at the merchant device;

initiating, independent of interacting with the mobile device, a transaction processing request for the transaction directly with the merchant device via one or more API calls exchanged with the sales application using the second SDK;

validating the first scan of the first machine-readable code, wherein the validating comprises:

executing a risk analysis of the transaction based on a plurality of parameters associated with an analysis of the account associated with the digital token, a condition for an expiration of the first machine-readable code, and whether a previous scan of the first machine-readable code has occurred;

providing an event in the application on the mobile device using the first SDK based on the transaction processing request using the first machine-readable code, wherein the event indicates at least the first scan by the merchant device;

determining whether to process the transaction processing request using the account based on the validating;

providing an animation via the mobile device indicating a result of the transaction processing request using the first SDK; and updating the code widget in the home screen interface, wherein the updating the code widget includes replacing the first machine-readable code with a second machine-readable code.

12. The method of claim 11, wherein the risk analysis is further based on information for the merchant device.

13. The method of claim 12, wherein the risk analysis is further based on at least one of mobile device data or a history for the account.

14. The method of claim 11, wherein the first machine-readable code comprises a quick response (QR) code, and wherein the QR code is limited for an amount of time and a single scan of the QR code.

15. The method of claim 11, wherein subsequent to the detecting the first scan, the method further comprises:

detecting a second scan of the first machine-readable code; and rejecting processing a transaction associated with the second scan based on the first scan.

16. The method of claim 11, further comprising:

invalidating the first machine-readable code after the expiration, wherein the updating is in response to one of a further request by the mobile device or an automatic generation decision based on the invalidating.

17. The method of claim 11, wherein the first machine-readable code is generated based on a location of the mobile device, and wherein the condition for the expiration is associated with the location.

18. The method of claim 11, wherein, after the detecting the first scan, the method further comprises:

determining encoded data in the first machine-readable code based on the first scan; and determining the account associated with the encoded data, wherein the account is utilized to process the transaction processing request.

19. The method of claim 11, wherein the use is detected based on an application programming interface (API) request from the mobile device without having a user approval via the application, and wherein the use comprises a launching of the code widget.

20. A non-transitory machine-readable medium having stored thereon machine-readable instructions executable to cause a machine to perform operations comprising:

detecting, via one or more processes of a first software development kit (SDK) for an application on a mobile device of a user, an activation of a code widget on the mobile device, wherein the activation comprises bringing the code widget to a foreground of a home screen interface on the mobile device independent of opening or executing the application;

determining, in response to the activation independent of a user input and an approval in the application, a first machine-readable code of a plurality of machine-readable codes displayable by the mobile device, wherein the first machine-readable code provides data for electronic transaction processing when the first machine-readable code is scanned;

generating the first machine-readable code using a digital token associated with an account of the user;

receiving an application programming interface (API) call from the one or more processes of the first SDK for the first machine-readable code for a transaction being processed via the code widget;

connecting with the application using the one or more processes of the first SDK;

transmitting the first machine-readable code to the application on the mobile device, wherein receiving the first machine-readable code by the application causes the first machine-readable code to be loaded in the code widget from the first SDK;

detecting a first scan performed by a merchant device of the first machine-readable code using a second SDK for a sales application on the merchant device, wherein the first scan is detected as being performed in association with the transaction being processed at the merchant device;

initiating, independent of interacting with the mobile device, a transaction processing request for the transaction directly with the merchant device via one or more API calls exchanged with the sales application using the second SDK;

validating the first scan of the first machine-readable code, wherein the validating comprises:

executing a risk analysis of the transaction based on a plurality of parameters associated with an analysis of the account associated with the digital token, a condition for an expiration of the first machine-readable code, and whether a previous scan of the first machine-readable code has occurred;

providing an event in the application on the mobile device using the first SDK based on the transaction processing request using the first machine-readable code, wherein the event indicates at least the first scan by the merchant device;

determining whether to process the transaction processing request using the account based on the validating;

providing an animation via the mobile device indicating a result of the transaction processing request using the first SDK; and updating the code widget in the home screen interface, wherein the updating the code widget includes replacing the first machine-readable code with a second machine-readable code.

* * * * *